(12) United States Patent
Kim et al.

(10) Patent No.: US 12,273,631 B2
(45) Date of Patent: Apr. 8, 2025

(54) COLOR FILTER SPECTRUM OPTIMIZATION METHOD AND ELECTRONIC APPARATUS PERFORMING THE SAME

(71) Applicant: SAMSUNG ELECTRONICS CO., LTD., Suwon-si (KR)

(72) Inventors: Geonwoo Kim, Suwon-si (KR); Sung Kwang Cho, Suwon-si (KR); Yang Ho Cho, Suwon-si (KR); Dong Kyung Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 18/129,450

(22) Filed: Mar. 31, 2023

(65) Prior Publication Data

US 2024/0107181 A1     Mar. 28, 2024

(30) Foreign Application Priority Data

Sep. 22, 2022   (KR) ........................ 10-2022-0119731

(51) Int. Cl.
*H04N 23/84*     (2023.01)
*H04N 1/60*      (2006.01)
(Continued)

(52) U.S. Cl.
CPC ............. *H04N 23/84* (2023.01); *H04N 1/603* (2013.01); *H04N 23/617* (2023.01); *H04N 23/85* (2023.01); *H04N 25/134* (2023.01)

(58) Field of Classification Search
CPC ........ H04N 23/10; H04N 23/12; H04N 23/60; H04N 23/617; H04N 23/84; H04N 23/841;
(Continued)

(56) References Cited

U.S. PATENT DOCUMENTS

RE39,712 E      7/2007 Vogel
10,244,190 B2   3/2019 Boulanger et al.
(Continued)

OTHER PUBLICATIONS

Graham D. Finlayson et al., "Designing Color Filters that Make Cameras More Colorimetric", IEEE Transactions on Image Processing, Nov. 2020, vol. 30, pp. 853-867, DOI: 10.1109/TIP.2020.3038523.

*Primary Examiner* — Twyler L Haskins
*Assistant Examiner* — Akshay Trehan
(74) *Attorney, Agent, or Firm* — Sughrue Mion, PLLC

(57) ABSTRACT

An optimization method includes determining first information related to a difference between the color filter spectrum and the color spectrum or a difference between an image transformed by the color transformation matrix and a ground truth (GT) image in the reset color space, determining second information representing smoothness of the color filter spectrum, third information representing a transmittance of the color filter spectrum, calculating a cost value based on the first information, the second information, and the third information, compare the calculated cost value and a threshold, and updating one of the filter spectrum information and the color transformation matrix in response to the calculated cost value being equal to or greater than the threshold.

20 Claims, 9 Drawing Sheets

(51) Int. Cl.
*H04N 23/617* (2023.01)
*H04N 23/85* (2023.01)
*H04N 25/13* (2023.01)

(58) Field of Classification Search
CPC ...... H04N 23/843; H04N 23/85; H04N 25/11; H04N 25/13; H04N 25/134; H04N 25/135; H04N 25/136; H04N 9/64; H04N 9/67; H04N 1/60; H04N 1/603; H04N 1/6033–6047
See application file for complete search history.

(56) References Cited

U.S. PATENT DOCUMENTS

| | | | |
|---|---|---|---|
| 11,006,088 B1 | 5/2021 | Pellikka et al. | |
| 2021/0364355 A1 | 11/2021 | Ben-Shahar et al. | |
| 2022/0003988 A1* | 1/2022 | Finlayson | G01J 3/463 |

* cited by examiner

COLOR FILTER SPECTRUM OPTIMIZATION METHOD AND ELECTRONIC APPARATUS PERFORMING THE SAME

CROSS-REFERENCE TO RELATED APPLICATION

This application claims priority from Korean Patent Application No. 10-2022-0119731, filed on Sep. 22, 2022, at the Korean Intellectual Property Office, the disclosure of which is incorporated herein by reference in its entirety.

BACKGROUND

1. Field

Methods and apparatuses consistent with embodiments relate to a color filter spectrum optimization method and an electronic apparatus performing the same.

2. Description of Related Art

Image sensors may sense colors according to transmission characteristics of color filter spectrums. Color filter spectrums may vary depending on various factors such as a manufacturer, a sensor type, a color filter material characteristic, a pixel structure of an image sensor, an optical characteristic of a microlens array of an image sensor, and the like.

SUMMARY

One or more example embodiments may address at least the problems and/or disadvantages described above, as well as other disadvantages not described above. However, example embodiments are not required to overcome and may not overcome any of the problems and disadvantages described above.

According to an aspect of an example embodiment, there is provided an optimization method performed by an electronic apparatus including, determining first information related to a) a difference between filter spectrum information representing a color filter spectrum and spectrum information representing a color spectrum in a present color space or b) a difference between an image transformed by a color transformation matrix and a ground truth (GT) image in the preset color space, determining second information representing smoothness of the color filter spectrum, determining third information representing a transmittance of the color filter spectrum, calculating a cost value based on the first information, the second information, and the third information, comparing the calculated cost value and a threshold, and, in response to the calculated cost value being equal to or greater than the threshold, updating one of the filter spectrum information and the color transformation matrix.

The determining of the first information may include obtaining filter spectrum information to which color transformation is applied by applying the color transformation matrix to the filter spectrum information and determining that a magnitude of a difference between the filter spectrum information to which the color transformation is applied and the spectrum information is the first information.

The optimization method may further include determining fourth information related to noise amplification of the color transformation matrix.

The calculating of the cost value may include calculating that a function value of an objective function based on a result of summing negative information of the third information, the first information, the second information, and the fourth information is the cost value.

The optimization method may further include applying a first weight to the first information, a second weight to the second information, a third weight to the third information, and a fourth weight to the fourth information.

The determining of the first information may include applying noise to an image comprising a plurality of spectral bands, filtering the image to which the noise is applied based on the color filter spectrum, performing image processing on the filtered image and obtaining a result image generated through the image processing, performing first color transformation on the obtained result image based on the color transformation matrix and obtaining a first color transformed image corresponding to the transformed image, applying the spectrum information to the image comprising the spectral bands and obtaining the GT image, and determining that a magnitude of a difference between the obtained first color transformed image and the obtained GT image is the first information.

The optimization method may further include performing second color transformation on the obtained first color transformed image and obtaining a second color transformed image, performing the second color transformation on the GT image and obtaining a color transformed GT image, and determining that a magnitude of a difference between the obtained second color transformed image and the color transformed GT image is fifth information.

The calculating of the cost value may include calculating that a function value of an objective function based on a result of summing negative information of the third information, the first information, the second information, and the fifth information is the cost value.

The optimization method may further include applying a first to the first information, a second weight to the second information, a third weight to the third information, and a fifth weight to the fifth information.

The image including the spectral bands may include a hyperspectral image.

The optimization method may further include, in response to the calculated cost value being less than the threshold, determining that the filter spectrum information is optimal filter spectrum information and that the color transformation matrix is an optimal color transformation matrix.

The optimization method may include, in response to the calculated cost value being less than the threshold, determining that the filter spectrum information and the color transformation matrix are a first optimal candidate pair, determining a second optimal candidate pair by updating one of the filter spectrum information and the color transformation matrix and calculating a second cost value based on the determined second optimal candidate pair, determining a third optimal candidate pair by updating another one of the filter spectrum information and the color transformation matrix and calculating a third cost value based on the third optimal candidate pair, in response to a predetermined number of optimal candidate pairs comprising the first through third optimal candidate pairs being determined, selecting one from among the first, second and third optimal candidate pairs based on the first, second and third cost values calculated for the determined optimal candidate pairs, and determining that filter spectrum information corresponding to the selected optimal candidate pair is optimal filter spectrum information and that a color transformation matrix corresponding to the selected optimal candidate pair is an optimal color transformation matrix.

The determining of the second information may include calculating a gradient of the filter spectrum information and determining a magnitude of the calculated gradient is the second information.

The determining of the third information may include determining that a magnitude of the filter spectrum information is the third information.

The filter spectrum information may be in a matrix form. Columns of the filter spectrum information in the matrix form may represent a plurality of color channels, and rows of the filter spectrum information in the matrix form may represent wavelength values in a visible band.

According to another aspect of an embodiment, an electronic apparatus may include a memory configured to store one or more of instructions and a processor configured to execute the instructions. When the instructions are executed, the processor may be configured to, determine first information related to a) a difference between filter spectrum information representing a color filter spectrum and spectrum information representing a color spectrum in a preset color space or b) a difference between an image transformed by a color transformation matrix and a GT image in the preset color space, determine second information representing smoothness of the color filter spectrum, determine third information representing a transmittance of the color filter spectrum, calculate a cost value based on the first information, the second information, and the third information, compare the calculated cost value and a threshold, and in response to the calculated cost value being equal to or greater than the threshold, update one of the filter spectrum information and the color transformation matrix.

The processor may be further configured to obtain filter spectrum information to which color transformation is applied by applying the color transformation matrix to the filter spectrum information and determine that a magnitude of a difference between the filter spectrum information to which the color transformation is applied and the spectrum information is the first information.

The processor may be further configured to determine fourth information related to noise amplification of the color transformation matrix and calculate that a function value of an objective function based on a result of summing negative information of the third information, the first information, the second information, and the fourth information is the cost value.

The processor may be further configured to apply noise to an image comprising a plurality of spectral bands, filter the image to which the noise is applied based on the color filter spectrum, perform image processing on the filtered image and obtain a result image generated through the image processing, perform first color transformation on the obtained result image based on the color transformation matrix and obtain a first color transformed image corresponding to the transformed image, obtain the GT image by applying the spectrum information to the image comprising the spectral bands, and determine that a magnitude of a difference between the obtained first color transformed image and the obtained GT image is the first information.

The processor may be further configured to perform second color transformation on the obtained first color transformed image and obtain a second color transformed image, perform the second color transformation on the obtained GT image and obtain a color transformed GT image, and determine that a magnitude of a difference between the obtained second color transformed image and the color transformed GT image is fifth information.

The processor may be further configured to calculate that a function value of an objective function based on a result of summing negative information of the third information, the first information, the second information, and the fifth information is the cost value.

The processor may be further configured to, in response to the calculated cost value being less than the threshold, determine that the filter spectrum information is optimal filter spectrum information and that the color transformation matrix is an optimal color transformation matrix.

BRIEF DESCRIPTION OF THE DRAWINGS

The above and/or other aspects will be more apparent from descriptions of example embodiments referring to the accompanying drawings, in which.

DETAILED DESCRIPTION

Figure 1:
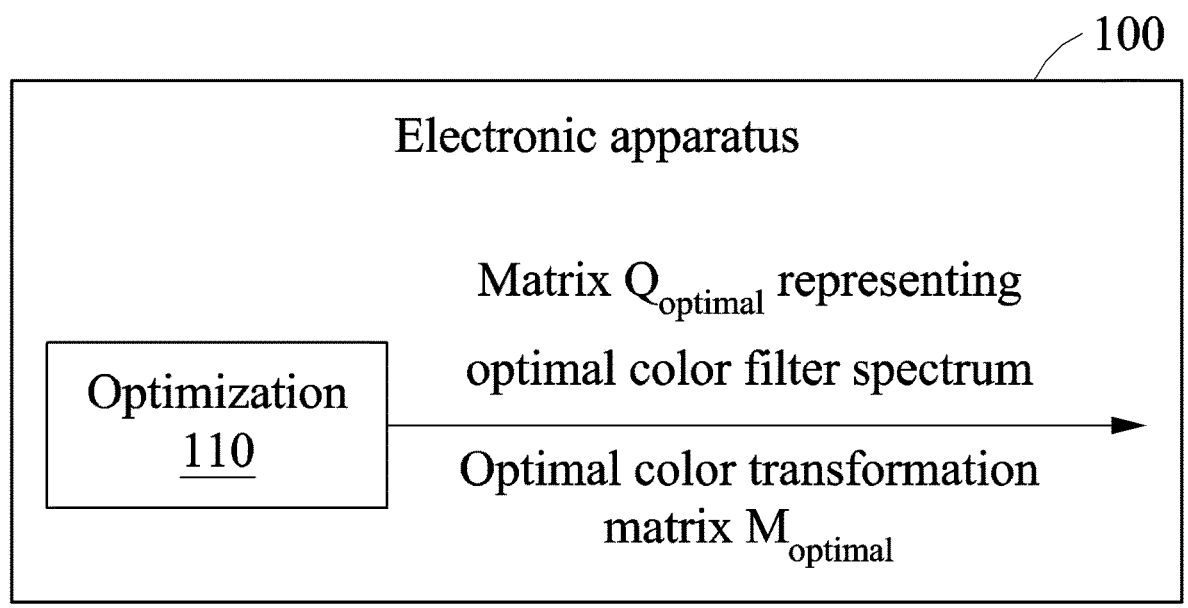
FIG. 1 is a diagram schematically illustrating a method by which an electronic apparatus optimizes a color filter spectrum and a color transformation matrix according to an embodiment.

The following detailed structural or functional description is provided as an example only and various alterations and modifications may be made to the embodiments. Here, the embodiments are not to be construed as limited to the disclosure and should be understood to include all changes, equivalents, and replacements within the concepts and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components. The first component may alternatively be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and any repeated description related thereto will be omitted.

FIG. 1 is a diagram schematically illustrating a method by which an electronic apparatus optimizes a color filter spectrum and a color transformation matrix according to an embodiment.

Referring to FIG. 1, an electronic apparatus 100 may perform an optimization operation 110 to optimize a color filter spectrum and a color transformation matrix.

In the optimization operation 110, the electronic apparatus 100 may set an objective function (or a cost function) based on criteria used to evaluate image quality and/or an element used to manufacture a color filter. Criteria used to evaluate the image quality may include, for example, a color error, a signal-to-noise ratio (SNR) (or a luminance signal-to-noise ratio (YSNR)), chroma noise, and the like. However, other measures of image quality may also be used. The element used to manufacture the color filter may include, for example, smoothness of a color filter spectrum, a transmittance of the color filter spectrum, an upper limit (e.g., 1) or a lower limit (e.g., 0) of a transmittance, a peak location of a spectrum, and the like. However, other manufacture characteristics may also be used. The smoothness of the color filter spectrum may indicate how smoothly a change rate or a waveform of the color filter spectrum changes.

The electronic apparatus 100 may determine a color filter spectrum and a color transformation matrix that optimizes the objective function. In other words, the electronic apparatus 100 may optimize the objective function by repeatedly updating a matrix Q representing the color filter spectrum and a color transformation matrix M. When the objective function is optimized, the electronic apparatus 100 may obtain a matrix $Q_{optimal}$ representing an optimal color filter spectrum and an optimal color transformation matrix $M_{optimal}$.

The optimization operation 110 may include a first optimization operation of optimizing the color filter spectrum such that the color filter spectrum is similar to a spectrum including a full range of colors visible to the human eye and a second optimization operation of optimizing the color filter spectrum such that the color filter spectrum is similar to a spectrum including colors that humans mainly observe.

In the first optimization operation, the electronic apparatus 100 may obtain a matrix QM by applying the color transformation matrix M to the matrix Q representing the color filter spectrum. The electronic apparatus 100 may optimize the objective function based on a difference between the obtained matrix QM and a matrix X representing a color spectrum (e.g., the spectrum including a full range of colors visible to the human eye) in a preset color space (e.g., a CIE XYZ color space), information related to noise amplification by the color transformation matrix M, smoothness of the color filter spectrum, and a transmittance of the color filter spectrum. Accordingly, the electronic apparatus 100 may obtain the optimal color filter spectrum and the optimal color transformation matrix that are similar to the spectrum including a full range of colors visible to the human eye, may minimize noise amplification that may occur during color transformation, and may maximize an amount of light.

The first optimization operation is described in detail with reference to FIGS. 2 through 4.

In the second optimization operation, the electronic apparatus 100 may apply noise to a hyperspectral image (HSI) and obtain a first color transformed image by applying the matrix Q representing the color filter spectrum and the color transformation matrix M to the HSI to which the noise is applied. The HSI may be an image including a continuous spectral band across several wavelength bands, such as a visible band, an ultraviolet band, and a near infrared band. The electronic apparatus 100 may obtain a ground truth (GT) image in the preset color space (e.g., the CIE XYZ color space) by applying the matrix X representing the color spectrum of the preset color space to the HSI. The electronic apparatus 100 may obtain a second color transformed image and a color transformed GT image by respectively mapping the obtained first color transformed image and the obtained GT image to different color spaces (e.g., CIE LAB color spaces). The different color spaces may be color spaces including colors that humans mainly observe. The electronic apparatus 100 may optimize the objective function based on a difference between the first color transformed image and the GT image, a difference between the second color transformed image and the color transformed GT image, the smoothness of the color filter spectrum, and the transmittance of the color filter spectrum. Accordingly, the electronic apparatus 100 may obtain the optimal color filter spectrum and the optimal color transformation matrix that are similar to the spectrum including the colors that humans mainly observe and may reduce chroma noise.

The second optimization operation is described in detail with reference to FIGS. 5 and 6.

Figure 2:
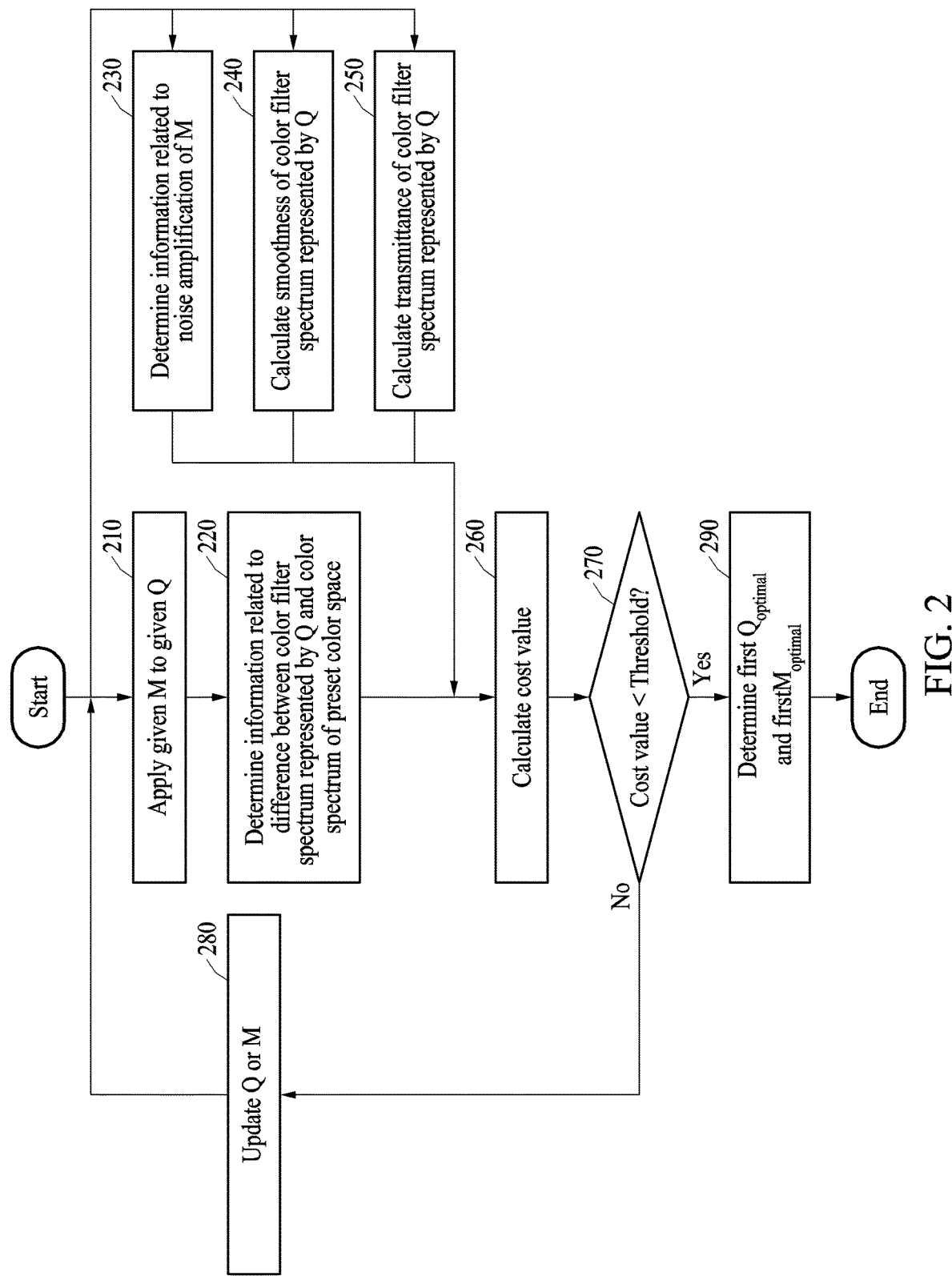
FIG. 2 is a diagram illustrating a first optimization operation of an electronic apparatus according to an embodiment.
Figure 3:
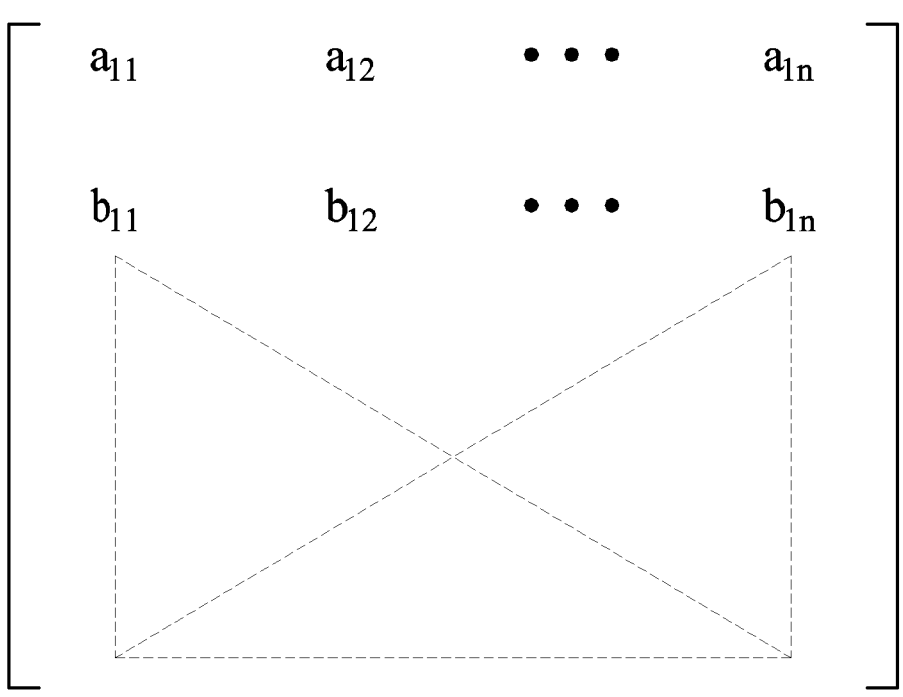
FIG. 3 illustrates an example structure of a matrix Q used in a first optimization operation according to an embodiment.
Figure 4:
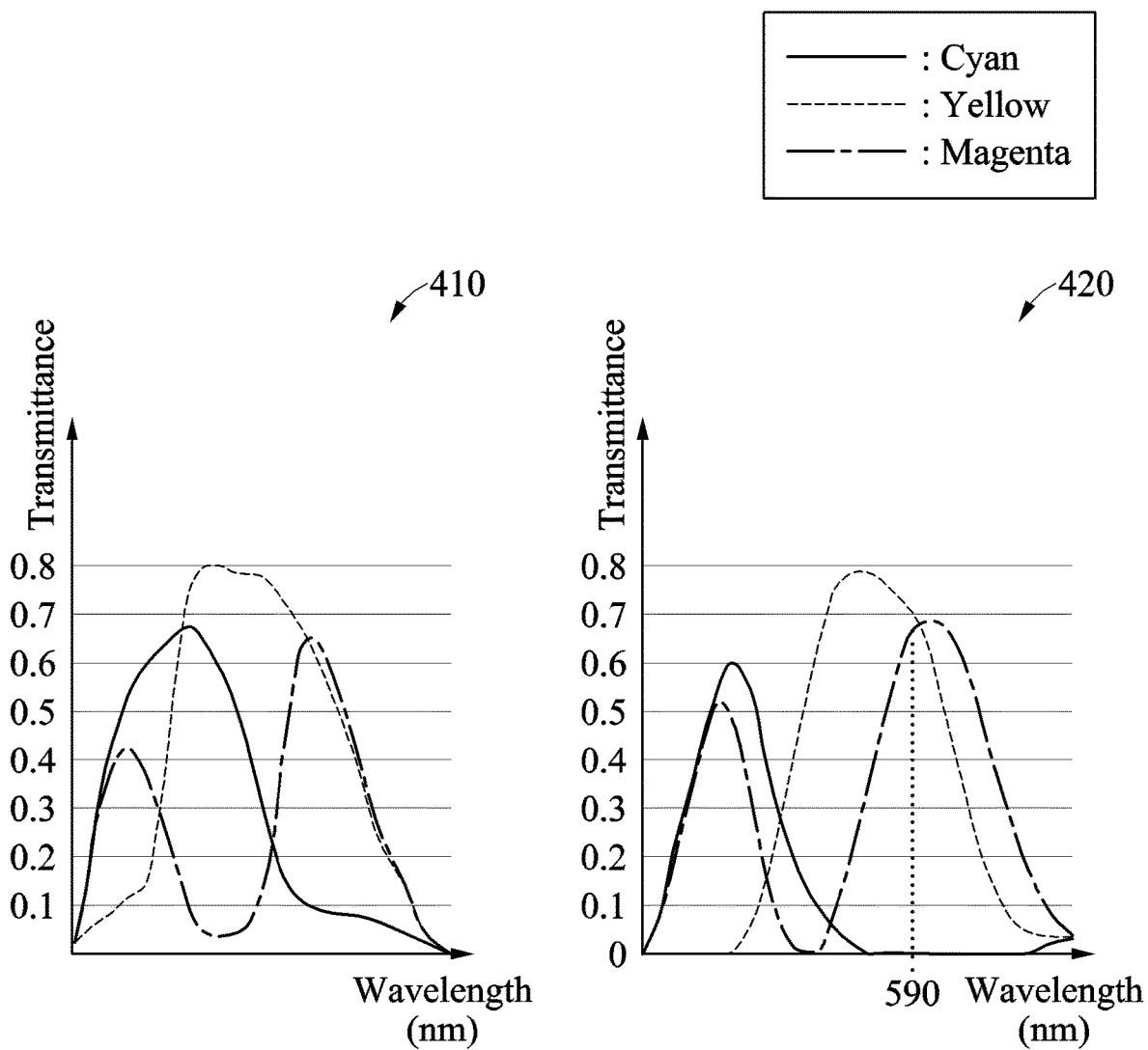
FIG. 4 illustrates an example filter spectrum and filter spectrum according to a first optimization of an embodiment.

FIGS. 2 through 4 are diagrams illustrating a first optimization operation according to an embodiment.

Referring to FIG. 2, in operation 210, the electronic apparatus 100 may apply a given color transformation matrix M to a given matrix Q.

The color transformation matrix M may be a matrix that transforms a color space of an input into a preset color space. The color space of the input may include, for example, a red-green-blue (RGB) space, a cyan-magenta-yellow (CMY) space, and the like. However, other color spaces may be used. The preset color space may be a color space having a color spectrum represented by the above-described matrix X and may include a color space (e.g., a CIE XYZ color space) including a full range of colors visible to the human eye. A matrix X may correspond to, for example, color matching functions in a CIE XYZ color system. However, examples are not limited thereto. The preset color space may include various color spaces such as a standard RGB (sRGB).

The color transformation matrix M may include, for example, a linear color transformation matrix, a polynomial color transformation matrix, and the like. However, other color transformations may be used. The color transformation matrix M may be in a form of n×3. n denotes a number of color channels, which are described later with reference to FIG. 3.

The matrix Q may be a matrix representing a color filter spectrum to be optimized. Rows of the matrix Q may represent wavelength values in a visible band, and columns may represent color channels. FIG. 3 illustrates an example of the matrix Q.

In the example illustrated in FIG. 3, the wavelength values in the rows of the matrix Q may include wavelength values in the visible band (400 to 700 nanometers (nm)) extracted at a predetermined interval. For example, when the predetermined interval is 10 nm, wavelength value 1 may be 400 nm, wavelength value 2 may be 410 nm, and wavelength value m may be 700 nm.

The number of color filter spectrums may be equal to a number of color channels. There may be n color channels when n color filter spectrums are to be optimized. In an embodiment, color channels may be RGB channels when an RGB color filter spectrum is to be optimized. Here, a number n of columns of the matrix Q may be 3. For example, color channel 1 may be an R channel, color channel 2 may be a G channel, and color channel 3 may be a B channel. In another embodiment, the color channels may be CMY channels when a complementary color (e.g., CMY) filter spectrum is to be optimized. Here, a number n of rows of the matrix Q may be 3. For example, color channel 1 may be a C channel, color channel 2 may be an M channel, and color channel 3 may be a Y channel.

Color filter spectrums and color channels to be optimized are not limited to the above-described examples.

When light having a wavelength value corresponding to each of the rows is incident on an image sensor, each of entries of the matrix Q may be a degree to which each of the color channels absorbs the incident light. For example, $a_{11}$ may be 0.000, $a_{12}$ may be 0.001, and $a_{1n}$ may be 0.000. This means that 0% of light having wavelength value 1 (e.g., 400 nm) is absorbed by color channel 1, 0.1% of the light is absorbed by color channel 2, and 0% of the light is absorbed by color channel n. For example, $b_{11}$ may be 0.083, $b_{12}$ may be 0.001, and $b_{1n}$ may be 0.1. This means that 8.3% of light having wavelength value 2 (e.g., 410 nm) is absorbed by color channel 1, 0.1% of the light is absorbed by color channel 2, and 10% of the light is absorbed by color channel n.

Referring back to FIG. 2, for example, in operation 210, a matrix $Q_0$ representing an initial color filter spectrum and an initial color transformation matrix $M_0$ may be provided. The electronic apparatus 100 may obtain a matrix $Q_0 M_0$ to which color transformation is applied by applying the initial color transformation matrix $M_0$ to the matrix $Q_0$. In other words, the electronic apparatus 100 may perform matrix multiplication between the matrix $Q_0$ and the initial color transformation matrix $M_0$.

In operation 220, the electronic apparatus 100 may determine information related to a difference between the color filter spectrum represented by the matrix Q and a color spectrum of a preset color space. The electronic apparatus 100 may calculate a difference (QM−X) between the matrix QM to which the color transformation is applied and the matrix X representing the color spectrum of the preset color space. The electronic apparatus 100 may determine that a magnitude (or a norm) (e.g., a Frobenius norm($\|\cdot\|_F^2$)) of the calculated difference (QM−X) is the information related to the difference between the color filter spectrum and the color spectrum of the preset color space.

For example, the electronic apparatus 100 may calculate a difference ($Q_0 M_0 - X$) between a matrix $Q_0 M_0$ to which the color transformation is applied and the matrix X. The electronic apparatus 100 may determine that a norm (e.g., $\|Q_0 M_0 - X\|_F^2$) of the calculated difference ($Q_0 M_0 - X$) is information related to a difference between an initial color filter spectrum represented by the matrix $Q_0$ and the color spectrum of the preset color space.

In operation 230, the electronic apparatus 100 may determine information related to noise amplification of the color transformation matrix M. The electronic apparatus 100 may calculate a singular value of the color transformation matrix M and determine that a magnitude (or a norm) of the singular value is the information related to the noise amplification of the color transformation matrix M. For example, the electronic apparatus 100 may determine that $\|$Singular Value $(M_0)\|_F^2$ of a singular value of the initial color transformation matrix $M_0$ is information related to noise amplification of the initial color transformation matrix $M_0$.

In operation 240, the electronic apparatus 100 may calculate smoothness of the color filter spectrum represented by the matrix Q. The electronic apparatus 100 may calculate a gradient $\Delta Q$ of the matrix Q and determine that a magnitude (or a norm) (e.g., $\|\Delta Q\|_F^2$) of the calculated gradient is the smoothness of the color filter spectrum represented by the matrix Q. For example, the electronic apparatus 100 may determine that $\|\Delta Q_0\|_F^2$ of a gradient $\Delta Q_0$ of the matrix $Q_0$ is smoothness of the initial color filter spectrum.

In operation 250, the electronic apparatus 100 may calculate a transmittance of the color filter spectrum represented by the matrix Q. The electronic apparatus 100 may determine that a magnitude (or a norm) (e.g., $\|Q_0\|_F^2$) of the matrix Q is a transmittance of the color filter spectrum represented by the matrix Q. For example, the electronic apparatus 100 may determine that $\|Q_0\|_F^2$ of the matrix $Q_0$ is a transmittance of the initial color filter spectrum represented by the matrix $Q_0$.

In operation 260, the electronic apparatus 100 may calculate a cost value (or an objective function value) of an objective function based on the information related to the difference between the color filter spectrum represented by the matrix Q and the color spectrum of the preset color space, information related to the noise amplification of the color transformation matrix M, the smoothness of the color filter spectrum represented by the matrix Q, and the transmittance of the color filter spectrum represented by the matrix Q.

The objective function may be expressed by Equation 1 below.

$$\min_{Q,M}(\|QM - X\|_F^2 + \|\text{Singular Value}(M)\|_F^2 + \|\Delta Q\|_F^2 - \|Q\|_F^2), \quad \text{[Equation 1]}$$

$$B_L \leq Q \leq B_U$$

In Equation 1, $B_L \leq Q \leq B_U$ is constraints of the objective function. $B_L$ may denote a zero matrix, and $B_U$ may denote a matrix of ones.

In Equation 1, $\|QM-X\|_F^2$ may minimize a difference between a spectrum to which the color transformation is applied and the color spectrum of the preset color space, $\|$Singular Value$(M)\|_F^2$ may minimize noise amplification caused by the color transformation matrix, and $\|\Delta Q\|_F^2$ may minimize a change rate of the color filter spectrum and smooth a shape of the color filter spectrum. A color filter with a higher transmittance is desirable, and the objective function of Equation 1 is used to solve a minimization problem. Accordingly, in Equation 1, negative (or minus) is applied to $\|Q\|_F^2$.

The objective function may be expressed by Equation 2 below.

$$\min_{Q,M}(\alpha \cdot \|QM - X\|_F^2 + \quad\quad\quad\quad \text{[Equation 2]}$$
$$\beta \cdot \|\text{Singular Value}(M)\|_F^2 + \gamma \cdot \|\Delta Q\|_F^2 - \delta \cdot \|Q\|_F^2),$$
$$B_L \leq Q \leq B_U$$

Unlike in Equation 1, in Equation 2, weights ($\alpha$, $\beta$, $\gamma$, and $\delta$) may be respectively applied to terms of the equation.

The electronic apparatus 100 may calculate a cost value (or a function value) of the objective function of Equation 1 or Equation 2.

In operation 270, the electronic apparatus 100 may compare the calculated cost value and a threshold.

In response to the calculated cost value being equal to or greater than the threshold, the electronic apparatus 100 may update the matrix Q or the color transformation matrix M in operation 280. For example, in response to the cost value, which is calculated when the matrix $Q_0$ and the initial color transformation matrix $M_0$ are provided, being equal to or greater than the threshold, the electronic apparatus 100 may update the matrix $Q_0$ among the matrix $Q_0$ and the initial color transformation matrix $M_0$ such that the cost value of the objective function is minimized (or such that the objective function is optimized).

When a result of updating the matrix $Q_0$ is a matrix $Q_1$, the electronic apparatus 100 may perform operations 210 through 270 on the matrix $Q_1$ and the initial color transformation matrix $M_0$. In operation 270, a cost value calculated based on the matrix $Q_1$ and the initial color transformation matrix $M_0$ may be equal to or greater than the threshold. Since a target of an immediate previous update is the matrix $Q_0$, in operation 280, the electronic apparatus 100 may update the initial color transformation matrix $M_0$ among the matrix $Q_1$ and the initial color transformation matrix $M_0$ such that the cost value of the objective function is minimized.

When a result of updating the initial color transformation matrix $M_0$ is a color transformation matrix $M_1$, the electronic apparatus 100 may perform operations 210 through 270 on the matrix $Q_1$ and the color transformation matrix $M_1$. In operation 270, a cost value calculated based on the matrix $Q_1$ and the color transformation matrix $M_1$ may be equal to or greater than the threshold. Since a target of an immediate previous update is the initial color transformation matrix $M_0$, in operation 280, the electronic apparatus 100 may update the matrix $Q_1$ among the matrix $Q_1$ and the color transformation matrix $M_1$. When a result of updating the matrix $Q_1$ is a matrix $Q_2$, the electronic apparatus 100 may perform operations 210 through 270 on the matrix $Q_2$ and the color transformation matrix $M_1$. In this way, the electronic apparatus 100 may alternately update a matrix $Q_1$ and a matrix calculate a cost value, and compare a cost value and a threshold iteratively. According to this iteration, a matrix $Q_n$ and a color transformation matrix $M_n$ may be provided.

The electronic apparatus 100 may perform operations 210 through 270 on the matrix $Q_n$ and the color transformation matrix $M_n$. In response to a cost value calculated based on the matrix $Q_n$ and the color transformation matrix $M_n$ being less than the threshold, the electronic apparatus 100 may determine that the matrix $Q_n$ is a matrix first $Q_{optimal}$ representing an optimal color filter spectrum and that the color transformation matrix $M_n$ is an optimal color transformation matrix first $M_{optimal}$ in operation 290. A color filter of an image sensor may be designed based on a color filter spectrum represented by the first $Q_{optimal}$ (the matrix $Q_0$. The first $M_{optimal}$ (the color transformation matrix $M_n$) may be provided to an image signal processor (ISP) for processing image data of the image sensor.

The objective functions of Equation 1 and Equation 2 are examples, and some terms may be removed from or another term may be added to the objective functions of Equation 1 and Equation 2 according to a design purpose of a color filter spectrum. For example, peaks of three color spectrums are located at a first wavelength value (e.g., 450 nm), a second wavelength value (e.g., 550 nm), and a third wavelength value (e.g., 650 nm), respectively, and each of the three color spectrums may need a color filter based on a Gaussian distribution. In this example, a Gaussian curve with a peak located at the first wavelength value, a Gaussian curve with a peak located at the second wavelength value, and a Gaussian curve with a peak located at the third wavelength value may be added as terms of an objective function. As another example, if smoothness of a first color spectrum of n color filter spectrums is to be greater in a first wavelength region than in another wavelength region, a weight may be applied to the smoothness of the first color filter spectrum in the first wavelength region.

A cost value of an objective function may be less than the threshold when the cost value is calculated after an occurrence of an event in which a cost value of an objective function is less than the threshold. When the event in which the cost value of the objective function is less than the threshold occurs, the electronic apparatus 100 may determine optimal candidate pairs having cost values less than the threshold and determine that one of the determined optimal candidate pairs is an optimal pair (first $Q_{optimal}$ and first $M_{optimal}$).

For example, in response to the cost value calculated based on the matrix $Q_n$ and the color transformation matrix $M_n$ being less than the threshold, the electronic apparatus 100 may determine that the matrix $Q_n$ and the color transformation matrix $M_n$ are a first optimal candidate pair. The electronic apparatus 100 may determine a second optimal candidate pair by updating one of the matrix $Q_n$ and the color transformation matrix $M_n$. When the matrix $Q_n$ is updated, the second optimal candidate pair may include a matrix $Q_{n+1}$ and the color transformation matrix $M_n$, and when the color transformation matrix $M_n$ is updated, the second optimal candidate pair may include the matrix $Q_n$ and a color transformation matrix $M_{n+1}$. The electronic apparatus 100 may calculate a cost value of the objective function based on the second optimal candidate pair. The electronic apparatus 100 may determine a third optimal candidate pair by updating one that is not updated previously among the matrix $Q_n$ and the color transformation matrix $M_n$ in the second optimal candidate pair. The third optimal candidate pair may include the matrix $Q_{n+1}$ and the color transformation matrix $M_{n+1}$. The electronic apparatus 100 may calculate a cost value of the objective function based on the third optimal candidate pair. In this way, the electronic apparatus 100 may determine a plurality of optimal candidate pairs having cost values less than the threshold.

The electronic apparatus 100 may select one from among the determined optimal candidate pairs through the cost values calculated respectively based on the determined optimal candidate pairs and determine that the selected optimal candidate pair is an optimal pair. For example, when a smallest cost value is a cost value calculated based on a matrix $Q_{n+4}$ and a color transformation matrix $M_{n+4}$ among the cost values calculated respectively based on the determined optimal candidate pairs, the electronic apparatus 100 may determine that the matrix $Q_{n+4}$ is the matrix first $Q_{optimal}$ representing a first optimal color filter spectrum and that the color transformation matrix $M_{n+4}$ is a first optimal color transformation matrix first $M_{optimal}$.

FIG. 4 illustrates an example of a CMY color filter spectrum 410 and an example of a CMY color filter spectrum 420 optimized according to a first optimization operation.

A magenta filter spectrum and a yellow filter spectrum of the CMY color filter spectrum 410 may overlap in a long wavelength band. In other words, a transmittance of the magenta filter spectrum and a transmittance of the yellow filter spectrum of the CMY color filter spectrum 410 may be similar in the long wavelength band. As a result, regarding the CMY color filter spectrum 410, colors in the long wavelength band may not be effectively separated.

A magenta filter spectrum and a yellow filter spectrum of the optimized CMY color filter spectrum 420 may cross at a value of 590 nm. In a long wavelength band beyond 590 nm, a transmittance of the magenta filter spectrum may be higher than that of the yellow filter spectrum. As a result, regarding the optimized CMY color filter spectrum 420, the colors may be effectively separated in the long wavelength band.

Table 1 below shows examples of color error, chroma noise, and YSNR of each of the CMY color filter spectrum 410 and the optimized CMY color filter spectrum 420.

TABLE 1

| | Color error | | | Chroma noise | | | YSNR | | |
|---|---|---|---|---|---|---|---|---|---|
| | A | D50 | D65 | A | D50 | D65 | A | D50 | D65 |
| Color filter spectrum 410 | 8.6 | 5.03 | 4.67 | 60.89 | 31.72 | 30.09 | 15.84 | 19.56 | 19.25 |
| Optimized CMY color filter 420 | 4.18 | 1.4 | 1.42 | 33.04 | 19.4 | 20.23 | 19.11 | 22.08 | 21.6 |

In Table 1 above, A may denote a color temperature (e.g., 2856 Kelvin (K)) based on a standard illuminant A, D50 may denote a first color temperature (e.g., 5000 K) based on a standard illuminant D, and D65 may denote a second color temperature (e.g., 6500 K) based on the standard illuminant D.

In Table 1 above, the optimized CMY color filter spectrum 420 may have a lower color error, lower chroma noise and a higher YSNR than the CMY color filter spectrum 410.

Figure 5:
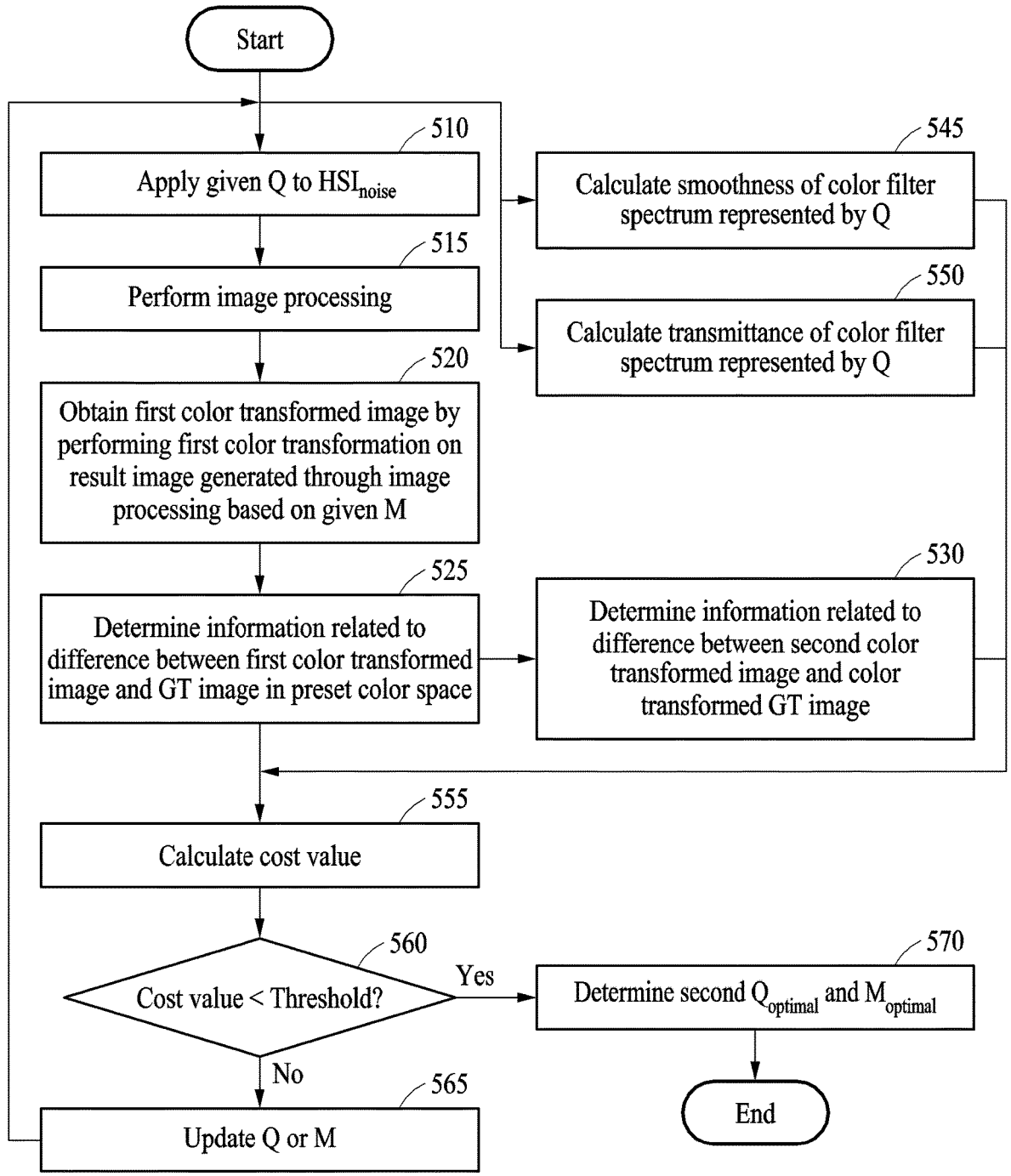
FIG. 5 is a diagram illustrating a second optimization operation according to an embodiment.
Figure 6:
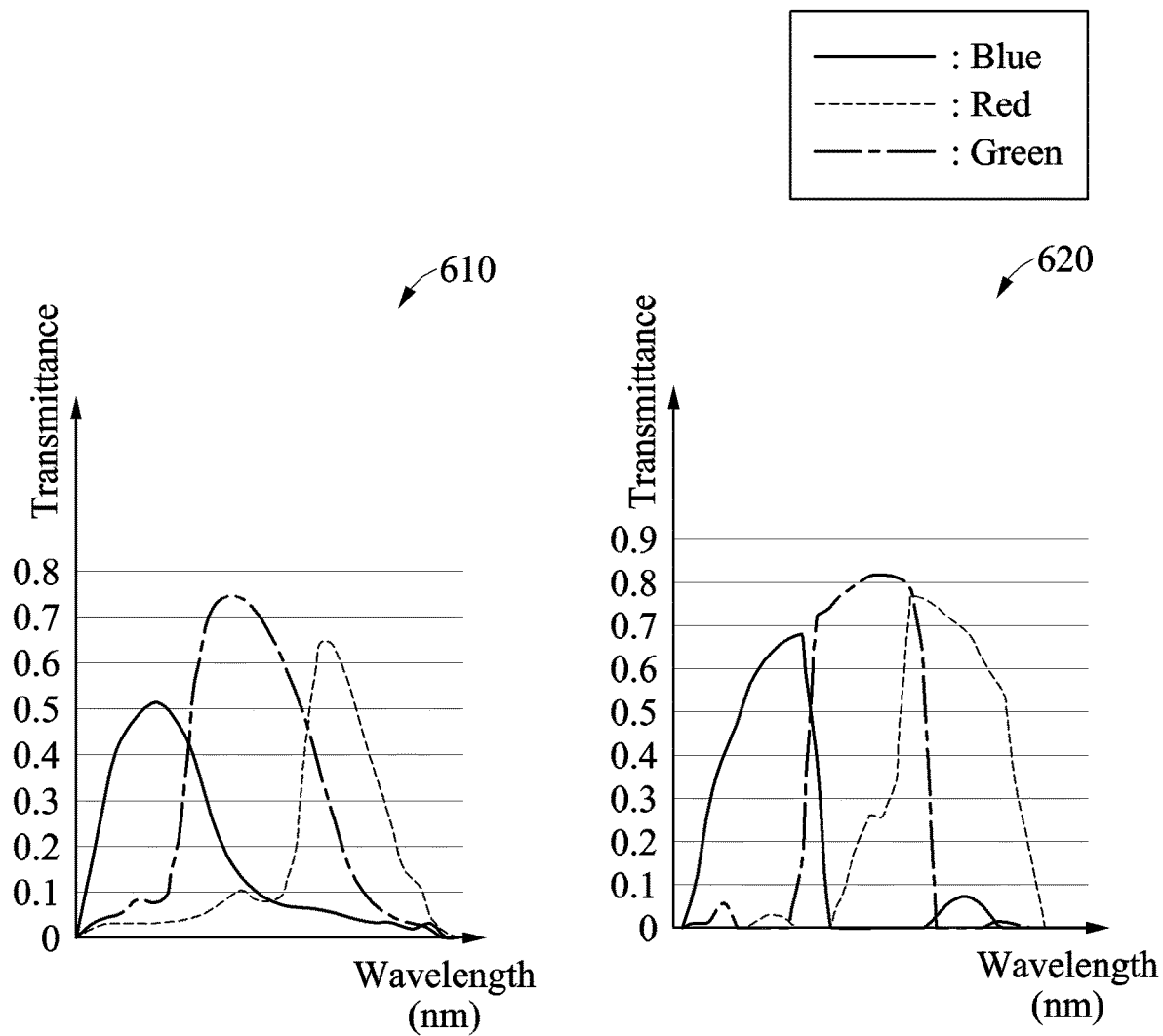
FIG. 6 illustrates an example filter spectrum and filter spectrum according to a second optimization of an embodiment.

FIGS. 5 and 6 are diagrams illustrating a second optimization operation according to an embodiment.

Referring to FIG. 5, in operation 510, the electronic apparatus 100 may apply a given matrix Q to an $HSI_{noise}$. In other words, the electronic apparatus 100 may filter the $HSI_{noise}$ based on a color filter spectrum corresponding to the matrix Q and obtain the filtered $HSI_{noise}$. The $HSI_{noise}$ may indicate that noise is applied to a given HSI. Hereinafter, the HSI may be referred to as "R," the noise may be referred to as "N," and the $HSI_{noise}$ may be referred to as "N(R)."

In operation 515, the electronic apparatus 100 may perform image processing on the filtered $HSI_{noise}$ and obtain a result image generated through the image processing. The image processing may include, for example, auto white balancing (AWB). However, examples are not limited thereto.

In operation 520, the electronic apparatus 100 may perform first color transformation on the result image N(R)Q generated through the image processing based on a color transformation matrix M and obtain a first color transformed image N(R)QM. A color space of the result image N(R)Q may be transformed into a preset color space by the first color transformation, and the electronic apparatus 100 may obtain a color transformed result image (e.g., the first color transformed image).

In operation 525, the electronic apparatus 100 may determine information related to a difference between the first color transformed image N(R)QM and a GT image in the preset color space. The electronic apparatus 100 may obtain a GT image RX in the preset color space by applying a matrix X representing a first color spectrum to an HSI R. The GT image RX may be an image in which the HSI R is mapped to the preset color space. The electronic apparatus 100 may calculate a difference (or a color difference) (N(R)QM−RX) between the first color transformed image N(R)QM and the GT image RX. The electronic apparatus 100 may determine that a magnitude (or a norm) (e.g., $\|N(R)QM-RX\|_F^2$) of the calculated difference (N(R)QM−RX) is the information related to the difference between the first color transformed image N(R)QM and the GT image.

In operation 530, the electronic apparatus 100 may determine information related to a difference between a second color transformed image and a color transformed GT image. The electronic apparatus 100 may perform second color transformation $f(\cdot)$ on each of the first color transformed image N(R)QM and the GT image RX and obtain the second color transformed image $f(N(R)QM)$ and the color transformed GT image $f(RX)$. The second color transformation may be an operation of transforming colors in the preset color space into colors in another color space. The other color space may include a color space (e.g., CIE LAB) including colors that humans mainly observe. However, examples are not limited thereto. The other color space may include sRGB, YCbCr, and the like. The electronic apparatus 100 may calculate a difference (or a color difference) $(f(N(R)QM)-f(RX))$ between the second color transformed image and the color transformed GT image. The electronic apparatus 100 may determine that a magnitude (or a norm) (e.g., $\|f(N(R)QM)-f(RX)\|_F^2$ of the calculated difference (f(N(R)QM)−f(RX)) is the information related to the difference between the second color transformed image and the color transformed GT image.

In operation 545, the electronic apparatus 100 may calculate smoothness of a color filter spectrum represented by the matrix Q. The description of operation 240 may apply to the description of operation 545.

In operation 550, the electronic apparatus 100 may calculate a transmittance of the color filter spectrum represented by the matrix Q. The description of operation 250 may apply to the description of operation 550.

In operation 555, the electronic apparatus 100 may calculate a cost value (or an objective function value) of an objective function based on information related to a difference between the first color transformed image and the GT image, the information related to the difference between the second color transformed image and the color transformed GT image, the smoothness of the color filter spectrum represented by the matrix Q, and the transmittance of the color filter spectrum represented by the matrix Q.

The objective function may be expressed by Equation 3 below.

$$\min_{Q,M}(\|N(R)QM - RX\|_F^2 +$$
$$\|f(N(R)QM) - f(RX)\|_F^2 + \|\Delta Q\|_F^2 - \|Q\|_F^2),$$
$$B_L \le Q \le B_U$$
[Equation 3]

In Equation 3, $\|N(R)QM-RX\|_F^2$ may minimize a color difference between the GT image in the preset color space and the first color transformed image, $\|f(N(R)Qm)-f(RX)\|_F^2$ may reduce chroma noise in another color space, and $\|\Delta Q\|_F^2$ may minimize a change rate of the color filter spectrum and smooth a shape of the color filter spectrum. A color filter with a higher transmittance is desirable, and the objective function of Equation 3 is used to solve a minimization problem. Accordingly, in Equation 3, negative (or minus) is applied to $\|Q\|_F^2$.

The objective function may be expressed by Equation 4 below.

$$\min_{Q,M}(\alpha \cdot \|N(R)QM - RX\|_F^2 +$$
$$\beta \cdot \|f(N(R)QM) - f(RX)\|_F^2 + \gamma \cdot \|\Delta Q\|_F^2 - \delta \cdot \|Q\|_F^2),$$
$$B_L \le Q \le B_U$$
[Equation 4]

Unlike in Equation 3, in Equation 4, weights ($\alpha$, $\beta$, $\gamma$, and $\delta$) may be respectively applied to terms of the equation.

The objective function may be expressed by Equation 5 below.

$$\min_{Q,M}(\alpha \cdot \|N(R)QM - RX\|_F^2 + \beta \cdot \|\text{Singular Value}(M)\|_F^2 +$$
$$\gamma \cdot \|\Delta Q\|_F^2 - \delta \cdot \|Q\|_F^2 + \epsilon \cdot \|f(N(R)QM) - f(RX)\|_F^2),$$
$$B_L \le Q \le B_U$$
[Equation 5]

In Equation 5, weights ($\alpha$, $\beta$, $\gamma$, $\delta$, and $\epsilon$) may be respectively applied to terms of the equation.

Equation 5 may further include $\beta \cdot \|\text{Singular Value}(M)\|_F^2$ compared to Equation 4. Accordingly, noise amplification caused by the color transformation matrix M may be alleviated.

The electronic apparatus 100 may calculate a cost value (or a function value) of Equation 3, Equation 4, or Equation 5 above.

In operation 560, the electronic apparatus 100 may compare the calculated cost value and a threshold.

In response to the calculated cost value being equal to or greater than the threshold, the electronic apparatus 100 may update the matrix Q or the matrix M in operation 565. For example, in response to a cost value calculated based on a matrix $Q_0$ and an initial color transformation matrix $M_0$ being equal to or greater than the threshold, the electronic apparatus 100 may update the matrix $Q_0$ among the matrix $Q_0$ and the initial color transformation matrix $M_0$ such that the cost value of the objective function is minimized. A matrix $Q_1$ may represent the updated matrix $Q_0$.

The electronic apparatus 100 may perform operations 510 through 560 on the given matrix $Q_1$ and initial color transformation matrix $M_0$. A cost value calculated based on the matrix $Q_1$ and the initial color transformation matrix $M_0$ may be equal to or greater than the threshold. Since a target of an immediate previous update is the matrix $Q_0$, in operation 565, the electronic apparatus 100 may update the initial color transformation matrix $M_0$ among the given matrix $Q_1$ and initial color transformation matrix $M_0$ such that the cost value of the objective function is minimized.

Similar to the described first optimization operation, the electronic apparatus 100 may alternately update a matrix $Q_i$ and a matrix $M_i$, calculate a cost value, and compare a cost value and a threshold iteratively. According to this iteration, a matrix $Q_Z$ and a color transformation matrix $M_Z$ may be provided.

The electronic apparatus 100 may perform operations 510 through 560 on the matrix $Q_z$ and the color transformation matrix $M_z$. In response to a cost value calculated based on the matrix $Q_z$ and the color transformation matrix $M_z$ being less than the threshold, the electronic apparatus 100 may determine that the matrix $Q_z$ is a matrix second $Q_{optimal}$ representing a second optimal color filter spectrum and that the color transformation matrix $M_z$ is a second optimal color transformation matrix second $M_{optimal}$ in operation 570. A color filter of an image sensor may be designed based on a color filter spectrum represented by the second $Q_{optimal}$ (the matrix $Q_z$). The second $M_{optimal}$ (the color transformation matrix $M_z$) may be provided to an ISP for processing image data of the image sensor.

The electronic apparatus 100 may calculate a cost value (or a function value) of Equation 6 below.

$$\min_{Q,M}(\alpha \cdot \|D(RQ)M - RX\|_F^2 + \beta \cdot \|\text{Singular Value}(M)\|_F^2 +$$
$$\gamma \cdot \|\Delta Q\|_F^2 - \delta \cdot \|Q\|_F^2 + \epsilon \|f(D(RQ)M) - f(RX)\|_F^2),$$
$$B_L \le Q \le B_U$$
[Equation 6]

In Equation 6, D(·) may denote demosaicing.

When the cost value of the objective function of Equation 6 is less than the threshold, the electronic apparatus 100 may determine that Q is a matrix representing an optimal color filter spectrum and that M is an optimal color transformation matrix.

The electronic apparatus 100 may calculate a cost value (or a function value) of an objective function of Equation 7 below.

$$\min_{Q,M}(\alpha \cdot \|RQM - RX\|_F^2 +$$
$$\beta \cdot \|\text{Singular Value}(M)\|_F^2 + \gamma \cdot \|\Delta Q\|_F^2 - \delta \cdot \|Q\|_F^2),$$
$$B_L \le Q \le B_U$$
[Equation 7]

When the cost value of the objective function of Equation 7 is less than the threshold, the electronic apparatus 100 may determine that Q is the matrix representing the optimal color filter spectrum and that M is the optimal color transformation matrix.

The objective functions of Equations 3 through 7 are examples, and some terms may be removed from or another term may be added to the objective functions of Equations 3 through 7 according to a design purpose of a color filter spectrum. For example, peaks of three color spectrums are located at a first wavelength value (e.g., 450 nm), a second wavelength value (e.g., 550 nm), and a third wavelength value (e.g., 650 nm), respectively, and each of the three color spectrums may need a color filter based on a Gaussian distribution. In this example, a Gaussian curve with a peak located at the first wavelength value, a Gaussian curve with a peak located at the second wavelength value, and a Gaussian curve with a peak located at the third wavelength value may be added as terms of an objective function. As another example, if smoothness of a first color spectrum of n color filter spectrums is to be greater in a first wavelength region than in another wavelength region, a weight may be applied to the smoothness of the first color filter spectrum in the first wavelength region.

A cost value of an objective function may be less than the threshold when the cost value is calculated after an occurrence of an event in which a cost value of an objective function is less than the threshold. When the event in which the cost value of the objective function is less than the threshold occurs, the electronic apparatus 100 may determine optimal candidate pairs having cost values less than the threshold and determine that one of the determined optimal candidate pairs is an optimal pair (second $Q_{optimal}$ and second $M_{optimal}$).

For example, in response to the cost value calculated based on the matrix $Q_z$ and the color transformation matrix $M_z$ being less than the threshold, the electronic apparatus 100 may determine that the matrix $Q_z$ and the color transformation matrix $M_z$ are a first optimal candidate pair. The electronic apparatus 100 may determine a second optimal candidate pair by updating one of the matrix $Q_z$ and the color transformation matrix $M_z$. When the matrix $Q_z$ is updated the second optimal candidate pair may include a matrix $Q_{z+1}$ and the color transformation matrix $M_z$, and when the color transformation matrix $M_z$ is updated the second optimal candidate pair may include the matrix $Q_z$ and a color transformation matrix $M_{z+1}$. The electronic apparatus 100 may calculate a cost value of the objective function based on the second optimal candidate pair. The electronic apparatus 100 may determine a third optimal candidate pair by updating one that was not updated previously among the matrix $Q_z$ and the color transformation matrix $M_z$ in the second optimal candidate pair. The third optimal candidate pair may include the matrix $Q_{z+1}$ and the color transformation matrix $M_{z+1}$. The electronic apparatus 100 may calculate a cost value of the objective function based on the third optimal candidate pair. In this way, the electronic apparatus 100 may determine a plurality of optimal candidate pairs having cost values less than the threshold.

The electronic apparatus 100 may select one from among the determined optimal candidate pairs through the cost values calculated respectively based on the determined optimal candidate pairs and determine that the selected optimal candidate pair is an optimal pair. For example, when a smallest cost value is a cost value calculated based on a matrix $Q_{z+3}$ and a color transformation matrix $M_{z+3}$ among the cost values calculated respectively based on the determined optimal candidate pairs, the electronic apparatus 100 may determine that the matrix $Q_{z+3}$ is the matrix second $Q_{optimal}$ representing the second optimal color filter spectrum and that the color transformation matrix $M_{z+3}$ is the second optimal color transformation matrix second $M_{optimal}$.

FIG. 6 illustrates an example of an RGB color filter spectrum 610 and an example of an RGB color filter spectrum 620 optimized according to a second optimization operation.

Regarding the RGB color filter spectrum 610, a transmittance may not drastically change at a cross point at which a blue filter spectrum and a green filter spectrum cross and at a cross point at which the green filter spectrum and a red filter spectrum cross. This element is not effective in lowering noise amplification during color transformation. Regarding the optimized RGB color filter spectrum 620, a transmittance may drastically change at a cross point at which a blue filter spectrum and a green filter spectrum cross and at a cross point at which the green filter spectrum and a red filter spectrum cross. This element is effective in lowering noise amplification during color transformation.

Table 2 below shows examples of color error, chroma noise, and YSNR of each of the RGB color filter spectrum 610 and the optimized RGB color filter spectrum 620.

TABLE 2

|  | Color error | | | Chroma noise | | | YSNR | | |
|---|---|---|---|---|---|---|---|---|---|
|  | A | D50 | D65 | A | D50 | D65 | A | D50 | D65 |
| RGB color filter spectrum 610 | 5.04 | 1.86 | 1.82 | 37.84 | 21.08 | 21.41 | 18.58 | 21.42 | 20.9 |
| Optimized RGB color filter spectrum 620 | 4.34 | 1.97 | 1.97 | 25.89 | 14.3 | 14.98 | 20.15 | 23.09 | 22.45 |

As shown in Table 2 above, at some color temperatures, a color error of the optimized RGB color filter spectrum 620 may be lower than that of the RGB color filter spectrum 610. The optimized RGB color filter spectrum 620 may have lower chroma noise and a higher YSNR than the RGB color filter spectrum 610.

Figure 7:
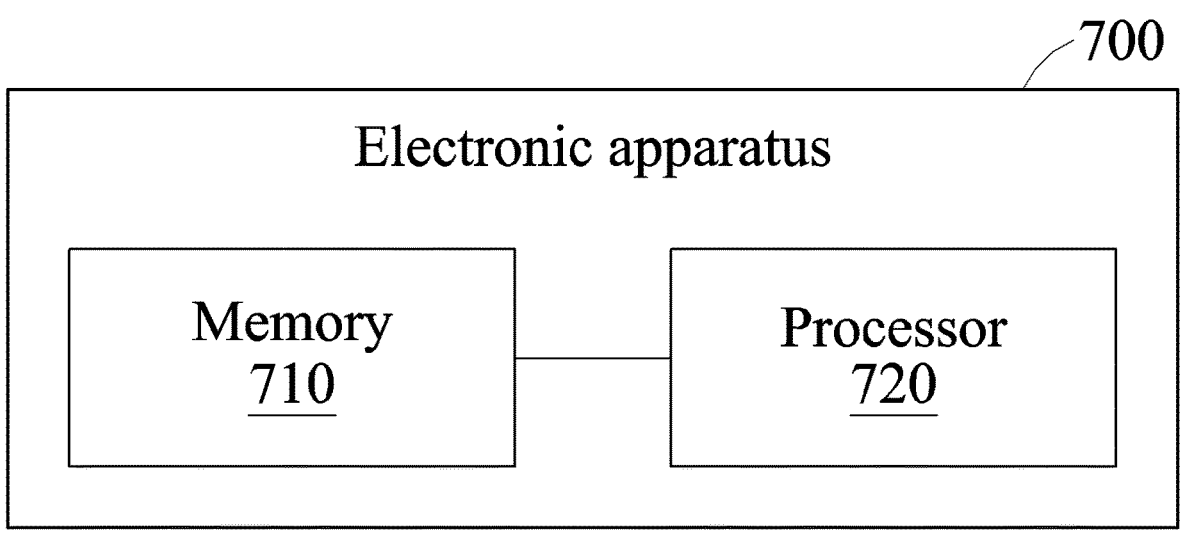
FIG. 7 is a block diagram illustrating a configuration of an electronic apparatus performing an optimization operation according to an embodiment.

FIG. 7 is a block diagram illustrating a configuration of an electronic apparatus performing an optimization operation according to an embodiment.

Referring to FIG. 7, an electronic apparatus 700 (e.g., the electronic apparatus 100) may include a memory 710 and a processor 720.

The memory 710 may store one or more instructions.

The processor 720 may execute the one or more instructions. The processor 720 may perform the above-described first optimization operation or second optimization operation by executing the one or more instructions. The processor 720 may store an operation result obtained in a process of the first optimization operation in the memory 710. The processor 720 may store an operation result obtained in a process of the second optimization operation in the memory 710.

The processor 720 may determine, based on filter spectrum information (e.g., the above-described matrix Q) representing a color filter spectrum, a color transformation matrix M, and spectrum information (e.g., the above-described matrix X) representing a color spectrum of a preset color space, first information (e.g., the above-described $\|QM-X\|_F^2$ or $\|N(R)QM-RX\|_F^2$) related to a difference between the color filter spectrum and the color spectrum of the preset color space or a difference between an image (e.g., the above-described first color transformed image) transformed by a color transformation matrix and a GT image in the preset color space.

The processor 720 may obtain filter spectrum information (e.g., a matrix QM) to which color transformation is applied by applying the color transformation matrix to the filter spectrum information and determine that a magnitude of a difference (e.g., QM−X) between the filter spectrum information to which the color transformation is applied and the spectrum information (e.g., the matrix X) is the first information.

The processor 720 may apply noise to an image (e.g., an HSI) including a plurality of spectral bands and filter the image to which noise is applied based on the color filter spectrum. The processor 720 may perform image processing (e.g., AWB) on the filtered image and obtain a result image generated through the image processing. The processor 720 may perform first color transformation on the obtained result image based on the color transformation matrix M and obtain a first color transformed image (e.g., the above-described N(R)QM). The processor 720 may obtain the GT image (e.g., the above-described RX) in the preset color space by applying the spectrum information (e.g., the matrix X) to the image (e.g., the HSI) including the spectral bands. The processor 720 may determine that a magnitude of a difference (e.g., N(R)QM−RX) between the obtained first color transformed image and the GT image in the preset color space is the first information.

The processor 720 may determine second information (e.g., $\|\Delta Q\|_F^2$) representing smoothness of a color filter spectrum. For example, the processor 720 may calculate a gradient of the filter spectrum information (e.g., the matrix Q) representing the color filter spectrum and determine that a magnitude of the calculated gradient is the second information.

The processor 720 may determine third information (e.g., $\|Q\|_F^2$) representing a transmittance of the color filter spectrum. For example, the processor 720 may determine that a magnitude of the filter spectrum information (e.g., the matrix Q) representing the color filter spectrum is the third information.

The processor 720 may calculate a cost value based on the first information, the second information, and the third information. For example, the processor 720 may calculate that a function value of an objective function obtained by summing negative information (e.g., $-\|Q_0\|_F^2$) of the third information, the first information, and the second information is the cost value.

The processor 720 may determine fourth information (e.g., the above-described $\|\text{Singular Value}(M)\|_F^2$) related to noise amplification of the color transformation matrix. The processor 720 may calculate that a function value of an objective function (e.g., Equation 1 or Equation 2) based on a result of summing the negative information (e.g., $-\|Q\|_F^2$) of the third information, the first information (e.g., $\|QM−X\|_F^2$), the second information (e.g., $\|\Delta Q\|_F^2$), and the fourth information is the above-described cost value.

The processor 720 may perform second color transformation on the first color transformed image and obtain a second color transformed image (e.g., the above-described $f(N(R)QM)$). The processor 720 may perform the second color transformation on the GT image in the preset color space and obtain a color transformed GT image (e.g., the above-described $f(RX)$). The processor 720 may determine that a magnitude of a difference between the second color transformed image and the color transformed GT image is fifth information (e.g., $\|f(N(R)QM)−f(RX)\|_F^2$). The processor 720 may calculate that a function value of an objective function (e.g., Equation 3, Equation 4, or Equation 5) based on a result of summing the negative information of the third information, the first information, the second information, and the fifth information is the above-described cost value.

The processor 720 may compare the calculated cost value and a threshold. In response to the calculated cost value being equal to or greater than the threshold, the processor 720 may update one of the filter spectrum information and the color transformation matrix. In response to the calculated cost value being less than the threshold, the processor 720 may determine that the filter spectrum information is optimal filter spectrum information and that the color transformation matrix is an optimal color transformation matrix. The processor 720 may determine that a color filter spectrum corresponding to the filter spectrum information when the cost value is less than the threshold is a color filter spectrum of an image sensor. The processor 720 may determine that a color transformation matrix when the cost value is less than the threshold is the optimal color transformation matrix for an ISP.

In response to the calculated cost value being less than the threshold, the processor 720 may determine that the filter spectrum information and the color transformation matrix are a first optimal candidate pair. The processor 720 may determine a second optimal candidate pair by updating one of the filter spectrum information and the color transformation matrix and calculate a cost value based on the determined second optimal candidate pair. The processor 720 may determine a third optimal candidate pair by updating another one of the filter spectrum information and the color transformation matrix and calculate a cost value based on the third optimal candidate pair. In response to a predetermined number of optimal candidate pairs including the first through third optimal candidate pairs being determined, the processor 720 may select one from among the determined optimal candidate pairs through the cost values calculated respectively based on the determined optimal candidate pairs. For example, the processor 720 may select an optimal candidate pair having a smallest cost value. The processor 720 may determine that filter spectrum information included in the selected optimal candidate pair is optimal filter spectrum information and that the color transformation matrix is the optimal color transformation matrix.

The description provided with reference to FIGS. 1 through 6 may apply to the electronic apparatus 700 of FIG. 7.

Figure 8:
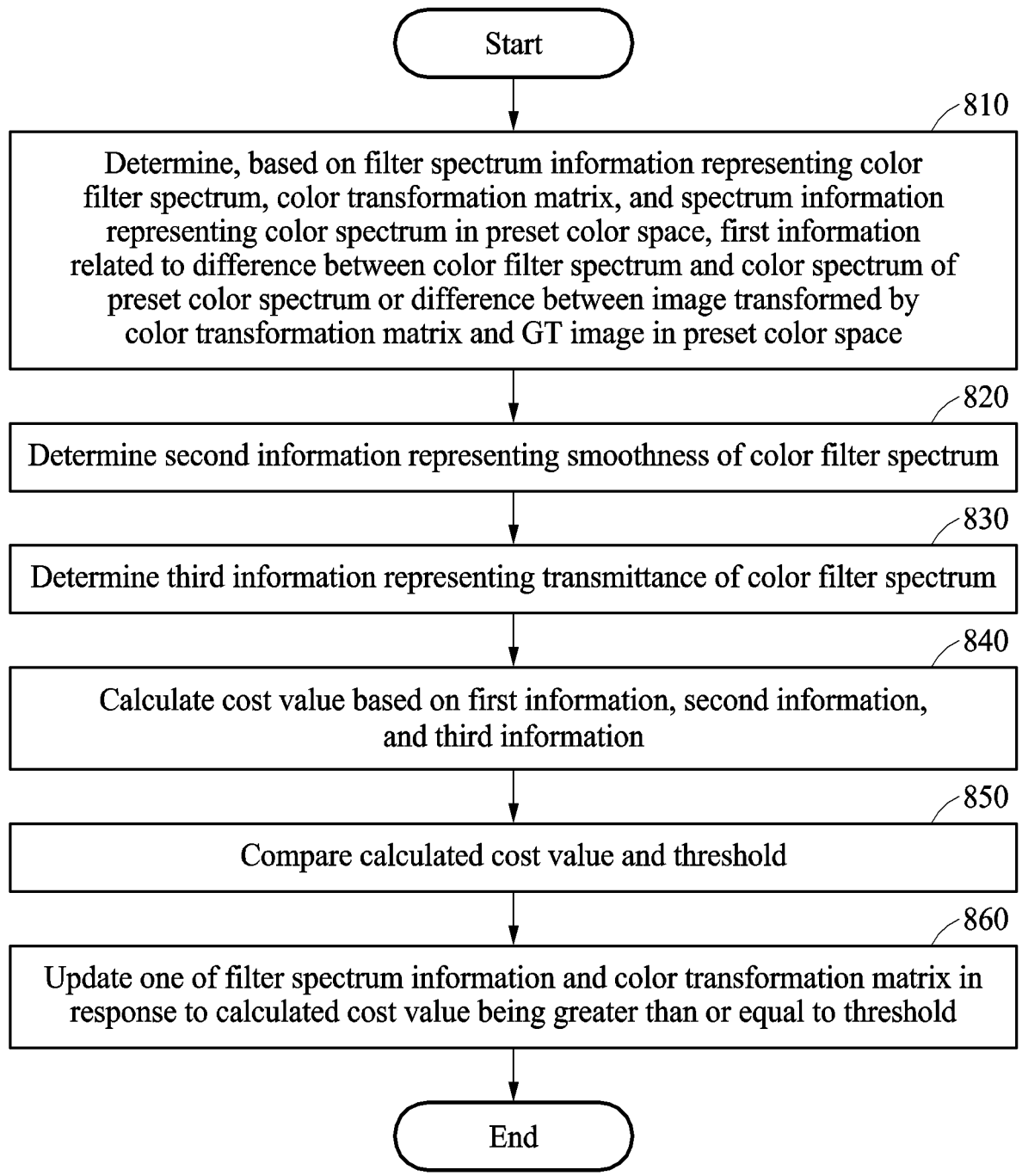
FIG. 8 is a flowchart illustrating an optimization method of an electronic apparatus according to an embodiment.

FIG. 8 is a flowchart illustrating an optimization method of an electronic apparatus according to an embodiment.

Referring to FIG. 8, in operation 810, the electronic apparatus 700 may determine, based on filter spectrum information representing a color filter spectrum, a color transformation matrix, and spectrum information representing a color spectrum in a preset color space, first information related to a difference between the color filter spectrum and the color spectrum of the preset color spectrum or a difference between an image transformed by the color transformation matrix and a GT image in the preset color space.

In operation 820, the electronic apparatus 700 may determine second information representing smoothness of the color filter spectrum.

In operation 830, the electronic apparatus 700 may determine third information representing a transmittance of the color filter spectrum.

In operation 840, the electronic apparatus 700 may calculate a cost value based on the first information, the second information, and the third information.

In operation 850, the electronic apparatus 700 may compare the calculated cost value and a threshold.

In operation 860, in response to the calculated cost value being equal to or greater than the threshold, the electronic apparatus 700 may update one of the filter spectrum information and the color transformation matrix. In response to updating one of the filter spectrum information and the color transformation matrix, the electronic apparatus 700 may repeat operations 810 through 840. If the cost value is less than the threshold, the optimization operations end. The optimized results may be applied to image data to provide a image with improved clarity.

The description provided with reference to FIGS. 1 through 7 may apply to the optimization method of FIG. 8.

Figure 9:
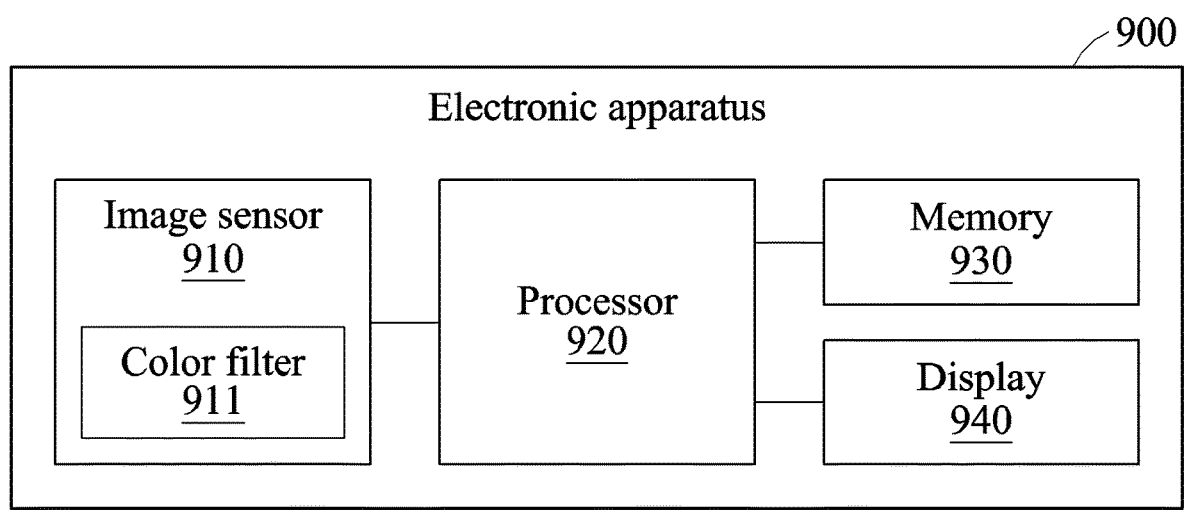
FIG. 9 is a block diagram illustrating an electronic apparatus including an image sensor having an optimal color filter spectrum according to an embodiment.

FIG. 9 is a block diagram illustrating an electronic apparatus including an image sensor having an optimal color filter spectrum according to an embodiment.

Referring to FIG. 9, an electronic apparatus 900 may include an image sensor 910, a processor 920, a memory 930, and a display 940.

The electronic apparatus 900 may be implemented as an autonomous vehicle, a smartphone, a digital camera, a tablet personal computer (PC), augmented reality (AR) glasses, a drone, a robot, or the like. However, examples are not limited thereto.

The image sensor 910 may include a color filter 911. The color filter 911 may have an optimal color filter spectrum determined by a first optimization operation or a second optimization operation.

The color filter 911 may include a color filter having a Bayer color pattern, a red-green-blue-emerald (RGBE) pattern, a cyan-yellow-yellow-magenta (CYYM) pattern, a cyan-yellow-green-magenta (CYGM) pattern, or a red-green-blue-white pattern. However, examples are not limited thereto.

The image sensor 910 may include a microlens array and a plurality of photo diodes (PDs). Light incident through the microlens array may pass through the color filter 911 and be detected by the plurality of PDs. The plurality of PDs may generate a raw image by transforming the detected light into an electrical signal. The image sensor 910 may transmit the raw image to the processor 920.

The processor 920 may include an ISP.

The processor 920 may perform preprocessing on the raw image. The preprocessing may include, for example, sensor image correction and demosaicing. The processor 920 may perform sensor image correction on the raw image to remove artifacts from the raw image. The sensor image correction may include, for example, bad pixel correction, lens shading correction, denoising, and the like. However, examples are not limited thereto. The processor 920 may perform demosaicing on the raw image on which the sensor image correction is performed.

The processor 920 may perform color transformation on the preprocessed raw image using an optimal color transformation matrix determined through the above-described first optimization operation or second optimization operation. Accordingly, the processor 920 may generate a color transformed image.

The processor 920 may generate a final image by performing image processing on the color transformed image. The image processing may include, for example, at least one of contrast adjustment, sharpness adjustment, saturation adjustment, or dithering adjustment, or a combination thereof. However, examples are not limited thereto.

The processor 920 may store the final image in the memory 930 and/or display the final image on the display 940.

The embodiments described herein may be implemented using a hardware component, a software component and/or a combination thereof. A processing apparatus may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other apparatus capable of responding to and executing instructions in a defined manner. The processing apparatus may run an operating system (OS) and one or more software applications that run on the OS. The processing apparatus also may access, store, manipulate, process, and create data in response to execution of the software. For purpose of simplicity, the description of a processing apparatus is used as singular; however, one skilled in the art will appreciate that a processing apparatus may include multiple processing elements and multiple types of processing elements. For example, the processing apparatus may include a plurality of processors, or a single processor and a single controller. In addition, different processing configurations are possible, such as parallel processors.

Software may include a computer program, a piece of code, an instruction, or some combination thereof, to independently or collectively instruct or configure the processing apparatus to operate as desired. Software and/or data may be embodied permanently or temporarily in any type of machine, component, physical or virtual equipment, computer storage medium or apparatus, or in a propagated signal wave capable of providing instructions or data to or being interpreted by the processing apparatus. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware apparatuses that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware apparatuses may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order and/or if components in a described system, architecture, apparatus, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optimization method performed by an electronic apparatus, the optimization method comprising:
   determining first information related to a) a difference between filter spectrum information representing a color filter spectrum and spectrum information representing a color spectrum in a preset color space or b) a difference between an image transformed by a color transformation matrix and a ground truth (GT) image in the preset color space;
   determining second information representing smoothness of the color filter spectrum;
   determining third information representing a transmittance of the color filter spectrum;
   calculating a cost value based on the first information, the second information, and the third information;
   comparing the calculated cost value and a threshold; and
   in response to the calculated cost value being equal to or greater than the threshold, updating one of the filter spectrum information and the color transformation matrix.

2. The optimization method of claim 1, wherein the determining of the first information comprises:
   obtaining filter spectrum information to which color transformation is applied by applying the color transformation matrix to the filter spectrum information; and
   determining that a magnitude of a difference between the filter spectrum information to which the color transformation is applied and the spectrum information is the first information.

3. The optimization method of claim 1, further comprising:
   determining fourth information related to noise amplification of the color transformation matrix,
   wherein the calculating of the cost value comprises calculating that a function value of an objective function based on a result of summing negative information of the third information, the first information, the second information, and the fourth information.

4. The optimization method of claim 3, further comprising:
   applying a first weight to the first information, a second weight to the second information, a third weight to the third information, and fourth weight to the fourth information.

5. The optimization method of claim 1, wherein the determining of the first information comprises:
   applying noise to an image comprising a plurality of spectral bands;
   filtering the image to which the noise is applied based on the color filter spectrum;
   performing image processing on the filtered image and obtaining a result image generated through the image processing;
   performing first color transformation on the obtained result image based on the color transformation matrix and obtaining a first color transformed image corresponding to the transformed image;
   applying the spectrum information to the image comprising the spectral bands and obtaining the GT image; and
   determining that a magnitude of a difference between the obtained first color transformed image and the obtained GT image is the first information.

6. The optimization method of claim 5, further comprising:
   performing second color transformation on the obtained first color transformed image and obtaining a second color transformed image;
   performing the second color transformation on the GT image and obtaining a color transformed GT image; and
   determining that a magnitude of a difference between the obtained second color transformed image and the color transformed GT image is fifth information.

7. The optimization method of claim 6, wherein the calculating of the cost value comprises calculating that a function value of an objective function based on a result of summing negative information of the third information, the first information, the second information, and the fifth information is the cost value.

8. The optimization method of claim 7, further comprising:
   applying a first weight to the first information, a second weight to the second information, a third weight to the third information, and a fifth weight to the fifth information.

9. The optimization method of claim 5, wherein the image comprising the spectral bands comprises a hyperspectral image (HSI).

10. The optimization method of claim 1, further comprising:
    in response to the calculated cost value being less than the threshold, determining that the filter spectrum information is optimal filter spectrum information and that the color transformation matrix is an optimal color transformation matrix.

11. The optimization method of claim 1, further comprising:
    in response to the calculated cost value being less than the threshold, determining that the filter spectrum information and the color transformation matrix are a first optimal candidate pair;
    determining a second optimal candidate pair by updating one of the filter spectrum information and the color transformation matrix and calculating a second cost value based on the determined second optimal candidate pair;
    determining a third optimal candidate pair by updating another one of the filter spectrum information and the color transformation matrix and calculating a third cost value based on the third optimal candidate pair;
    in response to a predetermined number of optimal candidate pairs comprising the first through third optimal candidate pairs being determined, selecting one from among the first, second and third optimal candidate pairs based on the first, second and third cost values calculated respectively for the determined optimal candidate pairs; and determining that filter spectrum information corresponding to the selected optimal candidate pair is optimal filter spectrum information and that a color transformation matrix corresponding to the selected optimal candidate pair is an optimal color transformation matrix.

12. The optimization method of claim 1, wherein
the determining of the second information comprises calculating a gradient of the filter spectrum information and determining a magnitude of the calculated gradient is the second information, and the determining of the third information comprises determining that a magnitude of the filter spectrum information is the third information.

13. The optimization method of claim 1, wherein
the filter spectrum information is in a matrix form, and
columns of the filter spectrum information in the matrix form represent a plurality of color channels, and rows of the filter spectrum information in the matrix form represent wavelength values in a visible band.

14. An electronic apparatus comprising:
a memory configured to store one or more instructions; and
a processor configured to execute the instructions,
wherein when the instructions are executed, the processor is configured to:
determine first information related to a a) difference between filter spectrum information representing a color filter spectrum and spectrum information representing a color spectrum in a present color space or b) a difference between an image transformed by a color transformation matrix and a ground truth (GT) image in the preset color space, determine second information representing smoothness of the color filter spectrum, determine third information representing a transmittance of the color filter spectrum, calculate a cost value based on the first information, the second information, and the third information, compare the calculated cost value and a threshold, and in response to the calculated cost value being equal to or greater than the threshold, update one of the filter spectrum information and the color transformation matrix.

15. The electronic apparatus of claim 14, wherein the processor is further configured to:
obtain filter spectrum information to which color transformation is applied by applying the color transformation matrix to the filter spectrum information and determine that a magnitude of a difference between the filter spectrum information to which the color transformation is applied and the spectrum information.

16. The electronic apparatus of claim 14, wherein the processor is further configured to:
determine fourth information related to noise amplification of the color transformation matrix and calculate that a function value of an objective function based on a result of summing negative information of the third information, the first information, the second information, and the fourth information is the cost value.

17. The electronic apparatus of claim 14, wherein the processor is further configured to:
apply noise to an image comprising a plurality of spectral bands, filter the image to which the noise is applied based on the color filter spectrum, perform image processing on the filtered image and obtain a result image generated through the image processing, perform first color transformation on the obtained result image based on the color transformation matrix and obtain a first color transformed image corresponding to the transformed image, obtain the GT image by applying the spectrum information to the image comprising the spectral bands, and determine that a magnitude of a difference between the obtained first color transformed image and the obtained GT image is the first information.

18. The electronic apparatus of claim 17, wherein the processor is further configured to:
perform second color transformation on the obtained first color transformed image and obtain a second color transformed image, perform the second color transformation on the obtained GT image and obtain a color transformed GT image, and determine that a magnitude of a difference between the obtained second color transformed image and the color transformed GT image is fifth information.

19. The electronic apparatus of claim 18, wherein the processor is further configured to:
calculate that a function value of an objective function based on a result of summing negative information of the third information, the first information, the second information, and the fifth information is the cost value.

20. The electronic apparatus of claim 14, wherein the processor is further configured to:
in response to the calculated cost value being less than the threshold, determine that the filter spectrum information is optimal filter spectrum information and that the color transformation matrix is an optimal color transformation matrix.

* * * * *